United States Patent [19]
Yumde et al.

[11] 3,883,685

[45] May 13, 1975

[54] PICTURE SIGNAL CONVERSION SYSTEM

[75] Inventors: Yasufumi Yumde; Takashi Furuhata, both of Yokohama, Japan

[73] Assignee: Hitachi, Ltd., Japan

[22] Filed: July 17, 1973

[21] Appl. No.: 379,950

[30] Foreign Application Priority Data

July 19, 1972 Japan .................................. 47-72341

[52] U.S. Cl. ...... 178/6.8; 178/DIG. 3; 178/DIG. 24

[51] Int. Cl. ............................................. H04n 7/12

[58] Field of Search .......... 178/6.8, DIG. 3, 6.6 DD, 178/DIG. 24; 340/347, 204, 206; 328/109; 329/107; 332/11

[56] References Cited

UNITED STATES PATENTS

| | | | |
|---|---|---|---|
| 3,526,900 | 9/1970 | McCoy | 178/6.6 DD |
| 3,564,127 | 2/1971 | Sziklai | 178/6.6 DD |
| 3,663,749 | 5/1972 | Cannon | 178/6.8 |
| 3,701,846 | 10/1972 | Zenzefilis | 178/DIG. 3 |

*Primary Examiner*—Howard W. Britton
*Attorney, Agent, or Firm*—Craig & Antonelli

[57] ABSTRACT

A system for converting an analog picture signal of a wide band into a pulse train signal of a narrow band composed of means for sampling and storing a picture signal of at least one frame, means for reading the stored signal at each sample value at an arbitrary rate, and means for producing a train of pulses with pulse intervals proportional to the read out sample values can reduce the average transmission time because the entire time of the pulse train signal representing one frame of picture varies depending on the contents of the picture. A system for converting a pulse train signal of a narrow band into an analog picture signal of a wide band composed of means for producing a signal of sample amplitudes proportional to the pulse intervals of a supplied pulse train signal, and storing means in which the signal of sample amplitudes is written at each pulse of the pulse train signal and from which the picture signal is read out at the rate equal to the period of sampling the picture signal after the end of the writing of a signal of one picture in the storing mean.

24 Claims, 12 Drawing Figures

PICTURE SIGNAL CONVERSION SYSTEM

BACKGROUND OF THE INVENTION

1. Field of the Invention

The present invention relates to a signal converting system suitable for transmitting or recording and reproducing a picture information signal by converting its frequency band, and more particularly, to a signal converting system suitable for transmitting a stationary picture signal or a stationary picture signal of frame drop out or skip scheme in the television which also will hereinafter be referred to as a stationary picture signal by employing a transmission medium having narrow band frequency characteristics such as a telephone line or an audio magnetic tape and in such a manner that the transmission time of the picture signal is effectively reduced.

2. Description of the Prior Art

It is well known that generally when a signal is transmitted in a longer time, the frequency band required for the transmission medium becomes narrower, while if it is transmitted in a shorter time, a transmission medium of a wide band becomes necessary. In such a picture signal transmission method, for example, in a transmission method in which a picture signal is subjected to band or speed conversion, the number of pictures which can be transmitted in unit time or the required transmission time therefor is constant irrespective of the property of the picture when the signal to be transmitted is converted into a constant transmission speed.

SUMMARY OF THE INVENTION

An object of the present invention is to provide a band conversion system which converts the band of a picture signal so that a stationary picture signal can be transmitted or recorded and reproduced by employing a transmission medium of a narrow frequency band.

Another object of the present invention is to provide a band conversion system which can effectively reduce the transmission time of a band converted picture signal.

A further object of the present invention is to provide a band conversion system which converts the band of a picture signal so that a picture signal can be transmitted or recorded and reproduced without deteriorating the quality of the signal even when a transmission medium tending to produce amplitude distortion is employed.

The fundamental principle of the transmission method employed in the system according to the present invention in order to achieve the above objects is that first on the transmitting side a picture signal is sampled and, after being converted into a pulse train signal having pulse intervals corresponding to the amplitudes of the sampled signals, sent to a transmission medium, and then on the receiving side the modulated pulse train signal is converted into amplitudes corresponding to the pulse intervals to be demodulated into original picture signal.

If the above-mentioned pulse intervals of the train of pulses of the signal are selected within the voice band, the picture signal can be transmitted through a transmission channel of a narrow band. It can also be recorded and reproduced by, for example, a magnetic tape recording apparatus of the voice band.

According to the present invention, even when a picture signal includes a DC component of a constant level and yet a signal transmission system cannot pass therethrough a DC component, the DC component can be transmitted by converting the picture signal into a signal of pulses as described above. It is also possible to increase or reduce the transmission time depending on the average level of the picture signal. For example, in the case of a positive picture signal, the constant amplitude of the black picture is lower than the constant amplitude of the white picture. Consequently, if there is constant correspondence between the intervals of pulses and the sampled amplitudes of the picture signal, the time intervals of the pulses of the black picture are narrower than those of the white picture with the result that the transmission time is shorter in the case of the black picture than in the case of the white picture.

If the minimum value of the time interval of the pulses is selected to be the maximum value of the voice frequency, for example, 4 KHz or less (period: 0.25ms or more), the modulated pulse train signal can be transmitted through a telephone line as well as recorded on a sound magnetic tape. Moreover, since the amplitude of a picture signal is converted into the time interval in the transmission method employed in the present invention, a faithful transmission or recording can be effected even if a transmission medium apt to produce amplitude distortion is employed.

DESCRIPTION OF THE PREFERRED EMBODIMENTS

Figure 1A:
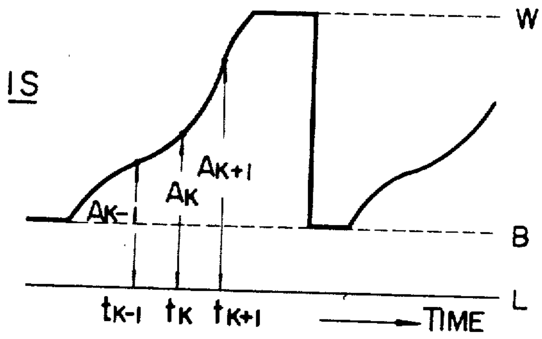
FIGS. 1*a* and 1*b* are signal waveforms for explaining the fundamental principle of the present invention.

First, the fundamental principle of the present invention will be described referring to FIGS. 1*a* and 1*b* which show the relation between a picture signal to be transmitted and a modulated pulse train signal. Reference character 1S in FIG. 1*a* designates an example of the waveform of the picture signal and reference character 2S in FIG. 1*b* designates an example of the waveform of the modulated pulse train signal suitable for transmission. The amplitudes . . . , $A_{k-1}$, $A_k$, $A_{k+1}$, . . . of the picture signal at times . . . , $t_{k-1}$, $t_k$, $t_{k+1}$, . . . with respect to the reference level L correspond to the modulated pulses . . . , $P_{k-1}$, $P_k$, $P_{k+1}$, . . . in FIG. 1*b*. That is, the amplitudes . . . , $A_{k-1}$, $A_k$, $A_{k+1}$, . . . of the picture signal 1S are converted into the time intervals of the pulses . . . , $P_{k-1}$, $P_k$, $P_{k+1}$, . . . with a constant proportional factor such that the amplitude $A_k$ corresponds to the interval between the pulses $P_{k-1}$ and $P_k$ and so on. FIG. 1*b* shows the case in which the proportional factor is one.

Figure 1B:
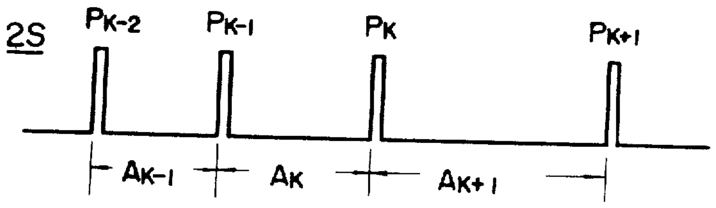

In FIG. 1*a* reference character B designates the minimum value of the amplitude of the picture signal 1S and reference character W designates the maximum amplitude thereof. For example, if the picture signal 1S is a positive picture signal, the minimum amplitude B corresponds to the black level, while the maximum amplitude W corresponds to the white level. Contrarily, if the picture signal 1S is a negative picture signal, the minimum amplitude B corresponds to the white level, while the maximum amplitude W corresponds to the black level. As already described hereinabove, according to the present invention, even when the picture signal includes a DC component of a constant level as shown in FIG. 1*a* and yet the signal transmission system cannot pass therethrough the DC component, there is the advantage that the DC component can also be transmitted by pulsing the picture signal as described above.

Figure 2:
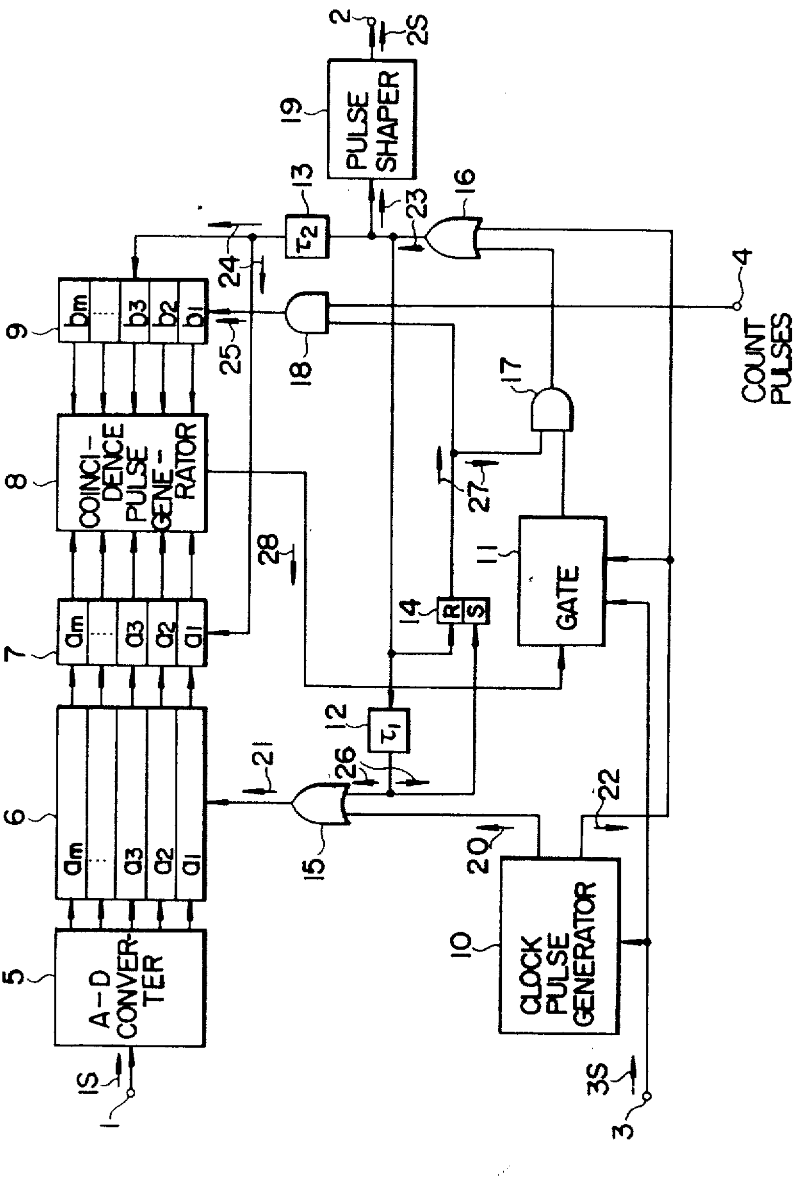
FIG. 2 is a block diagram of an apparatus for converting a picture signal into a pulse train signal of a narrow band.
Figure 3:
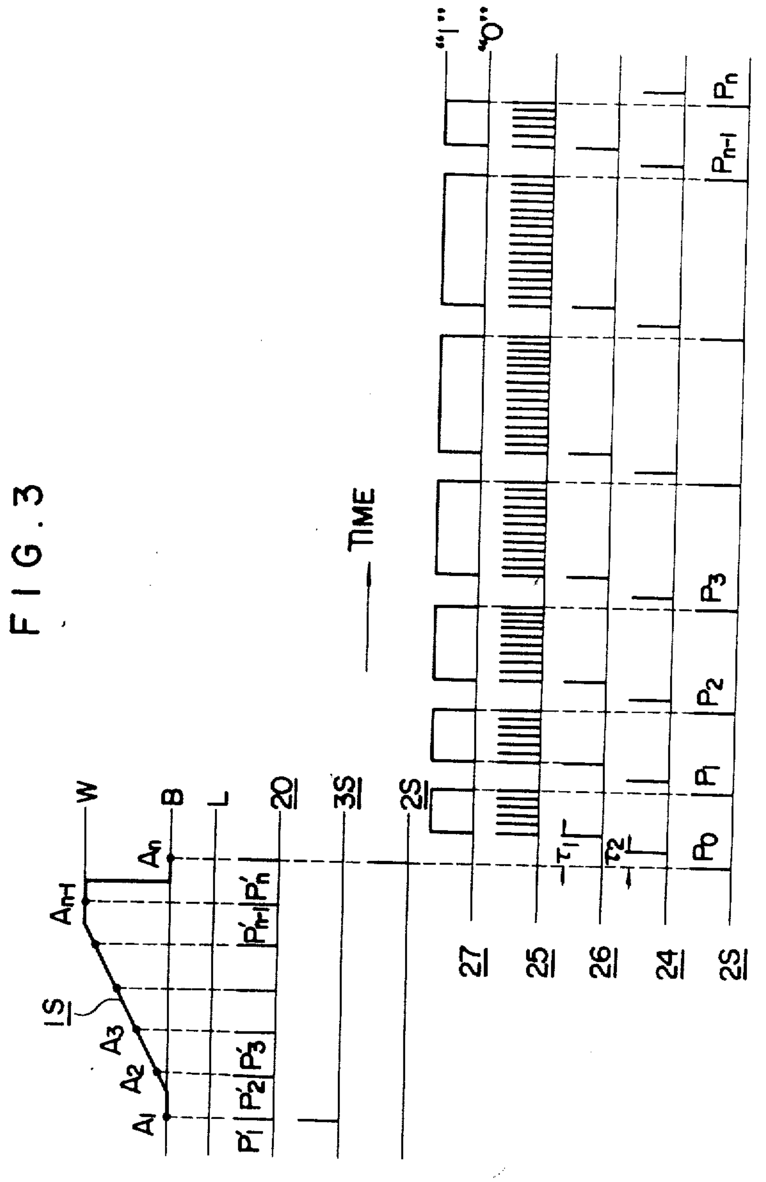
FIG. 3 is a diagram of signal waveforms for explaining the operation of the apparatus of FIG. 2.

An example of the apparatus for converting a picture signal of a wide band into a pulse train signal of a narrow band will next be described referring to FIGS. 2 and 3. In FIG. 2 reference numeral 1 designates an input terminal to which a picture signal 1S is supplied, reference numeral 2 designates an output terminal from which a modulated pulse train signal is derived, reference numeral 3 designates an input terminal to which a start pulse signal 3S instructing the start of conversion of signal is applied, reference numeral 4 designates an input terminal to which a count pulse signal is applied, reference numeral 5 designates an A-D converter which converts the picture signal 1S supplied to the input terminal 1 into an *m*-digit binary digital signal, and reference numeral 6 designates a digital memory for storing the digital signal. The digital memory 6 consists of *m* stages of parallel connection of memory sections of the same memory capacity for *m* digits $a_1$, $a_2$, . . . , $a_m$ which are arranged from the least significant digit to the most significant digit, respectively. Write-in or read-out can be made successively for the *m*-stages of memory sections by clock pulses 21 as for the shift register. The digital memory 6 has the memory capacity of one frame of the picture signal converted into digital signals. Reference numeral 7 designates a hold circuit which can hold for a constant time the signals read out from the digital memory 6 respectively for the *m* digits $a_1$, $a_2$, . . . , $a_m$ and set all the held values by a reset pulse signal 24 at the state 0 which will hereinafter be referred to as the reset state. Reference numeral 9 designates a pulse counter for counting the number of pulses of a count pulse signal 25 which originates from the count pulse signal applied to the input terminal 4 and passed through an AND circuit 18 and converting the counted pulses into a binary digital signal of *m* digits $b_1$, $b_2$, . . . , $b_m$ as numbered from the least significant digit. Reference numeral 8 designates a coincidence pulse signal generator which generates a coincidence pulse signal 28 only when the digits $a_1$, $a_2$, . . . , $a_m$ in the hold circuit 7 and the digits $b_1$, $b_2$, . . . , $b_m$ in the pulse counter 9 are respectively in agreement with each other, reference numeral 10 designates a write-in clock pulse signal generator which generates a write-in clock pulse signal 20 necessary for writing in the digital memory 6 when the start pulse signal 3S is applied thereto and generates a write-in end pulse signal 22 when the digital memory 6 is filled by successive write-in, reference numeral 11 designates a gate circuit which is gated to pass the coincidence pulse signal 28 by the start pulse signal 3S and the write-in end pulse signal 22 only during the read-out time of the digital memory 6, and reference numerals 12 and 13 designate pulse delay circuits for delaying pulses 23 by $\tau_1$ and $\tau_2$, respectively, where $\tau_1 > \tau_2$. Reference numeral 14 designates a flip-flop circuit in which when a pulse is applied to its input S, the output on the R side is set to the state 1, while when a pulse is applied to its input R, the output on the R side is set to the state 0, reference numerals 15 and 16 designate OR circuits, reference numerals 17 and 19 designate AND circuits, and reference numeral 19 designates a pulse shaping circuit for shaping the pulse signal 23 into the modulated pulse train signal 2S. The delay time $\tau_1$ is related to the time corresponding to the minimum amplitude B of the picture signal 1S. The delay time $\tau_2$ is for delaying the reset pulse 24 for the hold circuit 7 and the pulse counter 9 by a suitable time.

In operation, the write-in clock pulse signal 20 is generated by the application of the start pulse 3S to the clock pulse signal generator 10 and is supplied to the digital memory 6 through the OR gate 15. At each clock pulse ($P_1'$, $P_2'$, . . . , $P_n'$) of the write-in clock pulse signal 20 the input picture signal 1S is converted into a digital signal by the A-D converter 5 and is successively written in the digital memory 6. When the picture signal of one frame is written in to fill up the digital memory 6, the write-in end pulse signal 22 is generated by the clock pulse signal generator 10 and becomes the first pulse signal 23 through the OR circuit 16. The first pulse signal 23 is applied to the pulse delay circuit 12 and, after delayed by the time $\tau_1$ by the pulse delay circuit 12, is supplied to the digital memory 6 as the first read-out clock pulse signal 26. As a result, the first digital signal of *m* digits is read out and held in the hold circuit 7. On the other hand, the first read-out clock pulse signal 26 is also supplied to the input S of the flip-flop circuit 14 to set the output of its R side to the state 1. The count pulse signal supplied to the input terminal 4 can pass through the AND circuit 18 only during the time that the state 1 is maintained. Then, the pulse counter 9 begins to count the number of the pulses of the count pulse signal 25 which is the output of the AND circuit 18 and when the digits $a_1$, $a_2$, . . . , $a_m$ held in the hold circuit 7 and the digits $b_1$, $b_2$, . . . , $b_m$ in the counter 9 are respectively in agreement with each other, the coincidence pulse signal generator 8 generates the coincidence pulse signal 28. The coincidence pulse signal 28 becomes the second pulse signal 23 through the gate circuit 11, the AND circuit 17, and the OR circuit 16 and is supplied to the R input of the flip-flop circuit 14 to reset the R output to the state 0. Then, the count pulse signal supplied to the input terminal 4 can no longer pass through the AND circuit 18, so that the pulse counter 9 stops its counting operation. The second pulse signal 23 is also supplied to the pulse delay circuit 13 to become the reset pulse signal 24 by being delayed by the time $\tau_2$ by the pulse delay circuit 13 and is supplied to the hold circuit 7 and the pulse counter 9 to reset them. Though the coincidence pulse signal 28 is generated at this time also, it cannot pass through the AND circuit 17 even though it can pass through the gate circuit 11 because the flip-flop circuit 14 is already reset to the state 0. Consequently, the coincidence pulse signal 28 cannot be added to the pulse signal 23 in this case. The second pulse signal 23 becomes the second read-out clock pulse signal 26 by being delayed by the time $\tau_1$ by the pulse delay circuit 12. Then, the second digital signal is read out from the digital memory 6 and an operation similar to the previously one is repeated. By repeating this operation until all of the digital signals written in the digital memory 6 are read out, the amplitudes at various times of the picture signal 1S of one frame can be converted into pulse intervals with constant relationship therebetween depending on the delay time $\tau_1$ and the count pulse signal supplied to the input terminal 4 which can be derived from the output terminal 2 as the modulated pulse train signal 2S through the pulse shaping circuit 19. This conversion of the one frame of picture signal 1S into the pulse train signal 2S is performed each time the start pulse signal 3S is applied to the input terminal 3.

Figure 4A:
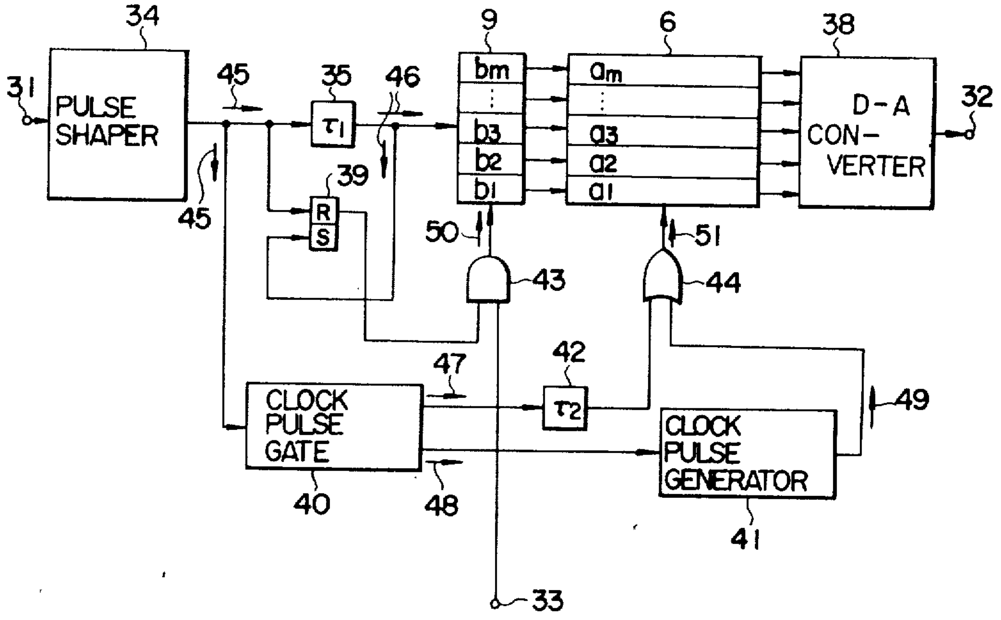
FIG. 4*a* is a block diagram of an apparatus for converting a pulse train signal of a narrow band into the original picture signal.

In FIG. 4*a* which shows a system for converting the pulse train signal into the original picture signal in block form, reference numeral 31 designates an input terminal to which the modulated pulse train signal is supplied, reference numeral 32 designates an output terminal from which a demodulated signal is derived, reference numeral 33 designates an input terminal to which the count pulse signal is applied, reference numeral 34 designates a pulse shaping circuit, reference numeral 35 designates a pulse delay circuit of a delay time of $\tau_1$, reference numeral 9 designates a pulse counter, reference numeral 6 designates a digital memory, the pulse conter 9 and the digital memory 6 being of the same function as those in FIG. 2, reference numeral 38 designates a D-A converter for converting a binary digital signal of *m* digits into an analog signal, reference numeral 40 designates a write-in clock pulse gate circuit which generates a write-in clock pulse signal 47 obtained by eliminating only the first pulse of an input pulse signal 45 and by passing the succeeding pulses and generates a write-in end pulse signal 48 designating the digital memory 6 being filled up, and reference numeral 41 designates a read-out clock pulse signal generator which generates a read-out clock pulse signal 49 necessary for reading out from the digital memory 6 upon application of the write-in end pulse signal 48 thereto.

In operation, the first pulse of the pulse signal 45 shaped by the shaping circuit 34 is applied to a flip-flop circuit 39 to reset its R output to 0 and, at the same time, is also applied to the pulse delay circuit 35. The pulse applied to the delay circuit 35 is delayed by the time $\tau_1$ and resets the pulse counter 9 and, at the same time, sets the R output of the flip-flop circuit 39 to 1. The state 1 of the R output is maintained until the second pulse of the pulse signal 45 is applied to the R input of the flip-flop circuit 39. The count pulse signal applied to the input terminal 33 can pass through an AND circuit 43 only during the state 1 of the R output of the flop-flop circuit 39, and counted by the pulse counter 9 to be converted into a digital signal of digits $b_1, b_2, \ldots b_m$. While the first pulse of the pulse signal 45 is eliminated by the write-in clock pulse gate circuit 40, the second and succeeding pulses pass through the gate circuit 40 and are delayed by the time $\tau_2$ by a pulse delay circuit 42 and then become the clock pulse signal 51 for writing in the digital memory 6 through an OR circuit 44. By the application of the clock pulse signal 51 to the digital memory 6 the digits $b_1, b_2, \ldots b_m$ in the pulse counter 9 are successively written in the momory sections $a_1, a_2, \ldots a_m$ of the ditital memory 6, respectively. If the signal written in the digital memory 6 is read out by the use of the read-out clock pulse signal 49 produced by the clock pulse signal generator 41 after the end of writing the signal in the digital memory 6, and if the read out digital signal is converted into an analog signal by the D-A converter 38, the original picture signal can be provided. Here, if the delay time of the pulse delay circuit 35 and the period of the count pulse signal applied to the input terminal 33 on the signal receiving side shown in FIG. 4*a* are made equal to the delay time of the pulse delay circuit 12 and the period of the count pulse signal applied to the input terminal 4 on the signal transmitting side shown in FIG. 2, it is possible to conversely convert the modulated pulse train signal into the picture signal symmetrically with the conversion of the picture signal to be transmitted into the modulated pulse train signal on the signal transmitting side.

Figure 4B:
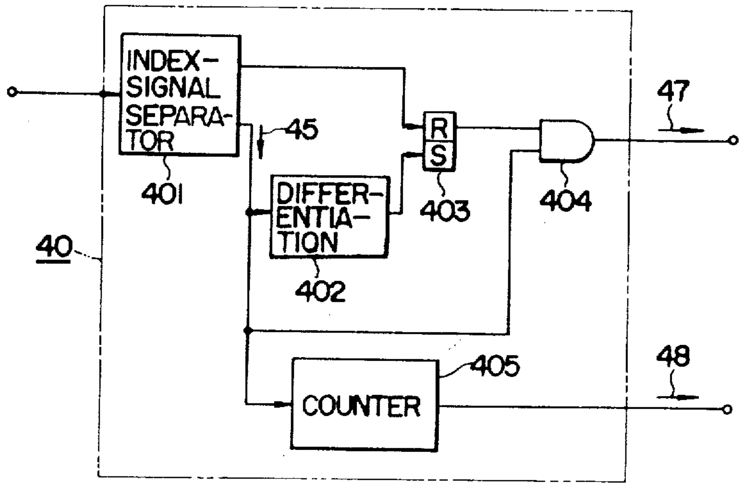
FIG. 4*b* is a block diagram of a practical example of the write-in clock pulse gate circuit in the apparatus of FIG. 4*a*.

An example of the structure of the write-in clock pulse gate circuit 40 whick eliminates the first pulse of the pulse signal 45 and passes the second and the succeeding pulses thereof is shown in FIG. 4*b*. In case the picture signal which is converted into the pulse signal is transmitted or recorded and received or reproduced, it is generally practiced to insert an INDEX (not shown) before the signal of each picture. Reference numeral 401 in FIG. 4*b* designates a circuit for separating the INDEX signal from the picture signal. A simple example of the INDEX signal is a pulse of the polarity opposite to that of the pulse train of the picture signal. In such a case, the INDEX signal separator circuit 401 can be composed of two sets of rectifying elements such as diodes. The INDEX signal separated by the separator circuit 401 is applied to the R input of a flip-flop circuit 403 to reset it to 0. The other output, the pulse signal of the picture signal 45, of the INDEX signal separator circuit 401 is supplied to a differentiating circuit 402 to derive the signal indicating the trailing edge of the pulse which is applied to the S input of the flip-flop 403 to set its R output to 1. Consequently, at the trailing edge of the first pulse of the pulse signal 45 of the picture signal the R output of the flip-flop circuit 403 is set at 1 which is supplied to the one input of an AND gate 404. As a result, at the output of the AND gate 404 appears the second pulse of the pulse signal 45. At the output of the differentiating circuit 402 are provided the same number of pulses as the pulses supplied to the circuit 402 during the time that the pulse are supplied to the circuit 402 and applied to the flip-flop circuit 403. However, since the flip-flop 403 is set at 1 by the first pulse supplied thereto, the state 1 is maintained during the application of those pulses. When the next INDEX signal is supplied after the completion of the signal for one frame, the flip-flop circuit 403 is reset and the AND gate 404 is closed. Thus, as described above, the first pulse of the picture signal is eliminated.

The write-in end pulse signal 48 designating the filling up of the digital memory 6 can be produced by, for example as shown in FIG. 4*b*, counting the pulses of the pulse signal 45 of the picture signal by a counter 405 to detect the number of pulses for one picture frame.

The above description is for the embodiment in which the conversion and the inverse conversion between the picture signal and the modulated pulse train signal are treated digitally. But, an analog operation is also possible.

Figure 5:
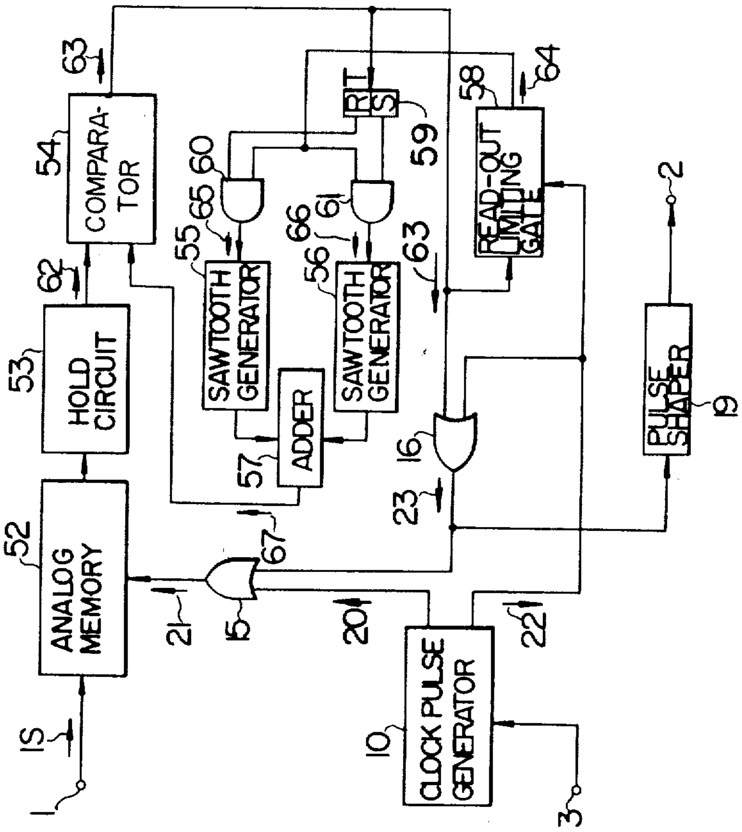
FIG. 5 is a block diagram of another apparatus for converting a picture signal into a pulse train signal of a narrow band.

FIG. 5 is an embodiment of the apparatus for analog conversion of the picture signal into the pulse train signal of a narrow band. Reference numeral 52 designates an analog memory in which successive writing or from which successive reading can be performed by the clock pulse signal 21, reference numeral 53 designates a hold circuit for holding the analog signal read from the analog memory 52 for a constant time, reference numeral 54 designates a voltage comparator for comparing the voltages of an input signal 62 from the hold circuit 53 and another input signal 67 to produce a coincidence pulse signal 63 only when the above two voltages are in agreement with each other, reference numeral 59 designates a flip-flop circuit the R and S outputs of which are alternately set to the state 1 each time a pulse is applied to its input T, reference numerals 55 and 56 designate intermittent saw tooth wave generators the output voltages of which rise linearly (ramp voltages) when their respective input pulse signals 65 and 66 are in the state 1, and are reset to the start voltage of the linearly rising voltage when the input pulse signals 65 and 66 are in the state 0, reference numeral 57 designates a voltage adder for adding the output voltages of the saw tooth wave generators 55 and 56 to produce a continuous saw tooth wave signal 67, and reference numeral 58 designates a read-out limiting gate circuit which produces a read-out limiting pulse signal 64 maintaining the state 1 only during the read-out period of the analong memory 52 by the coincidence pulse signal 63 from the voltage comparator 54 and the write-in end pulse signal 22 from the clock pulse signal generator 10.

In operation, the input picture signal 1S is written in the analog memory 52 in its analog form by the write-in clock pulse signal 20. After the completion of the writing in, the write-in end pulse signal 22 becomes the first pulse signal 23 through the OR circuit 16 and is applied to the analog memory 52 through the OR circuit 15. Then, the first analog value is read out from the analog memory 52 and held by the hold circuit 53. On the other hand, since the read-out limiting pulse signal 64 maintains its 1 state during the read-out period, the state 1 of the R or S output of the flip-flop circuit 59 can pass through the AND circuit 60 or 61. If it is assumed that the R output is 1 and the S output is 0, the state 1 is applied to the intermittent saw tooth wave generator 55 through the AND circuit 60. As a result, the intermittent saw tooth wave generator 55 produces a ramp voltage which is applied to the voltage comparator 54 as an input signal 67 through the voltage adder 57. The linear rise of this ramp voltage continues until it becomes equal to the voltage held by the hold circuit 53, but once it exceeds this value, the voltage comparator 54 produces the first coincidence pulse signal 63 which is applied to the input T of the flip-flop circuit 59. Then, the R output of the flip-flop circuit 59 is instantaneously inverted to the state 0 to reset the output voltage of the intermittent saw tooth wave generator 55 to the start voltage of its linear rise. On the other hand, the S output of the flip-flop circuit 59 is set to the state 1 which is applied to the intermittent saw tooth wave generator 56 through the AND gate 61 to produce a ramp voltage having the same slope as that produced by the saw tooth wave generator 55. The ramp voltage is applied to the voltage comparator 54 through the voltage adder 57. After all, each time the coincidence pulse signal 63 is produced, the intermittent saw tooth wave generators 55 and 56 alternately produce ramp voltages to provide a continuous saw tooth wave signal 67. The first coincidence pulse signal 63 becomes through the OR gate 16 the second pulse signal 23 which is applied to the analog memory 52 to read out the second analog value therefrom. The read out second analog value is applied to the hold circuit 53 and when the linearly rising voltage of the saw tooth wave signal 67 exceeds the hold voltage, the second coincidence pulse signal 63 is produced.

After all, by repeating the above-described operation until the analog signal written in the analog memory 52 is entirely read out, the amplitudes of the input picture signal 1S can be converted into the pulse intervals corresponding to the degree of the slopes of the ramp voltages produced by the intermittent saw tooth wave generators 55 and 56.

Figure 6:
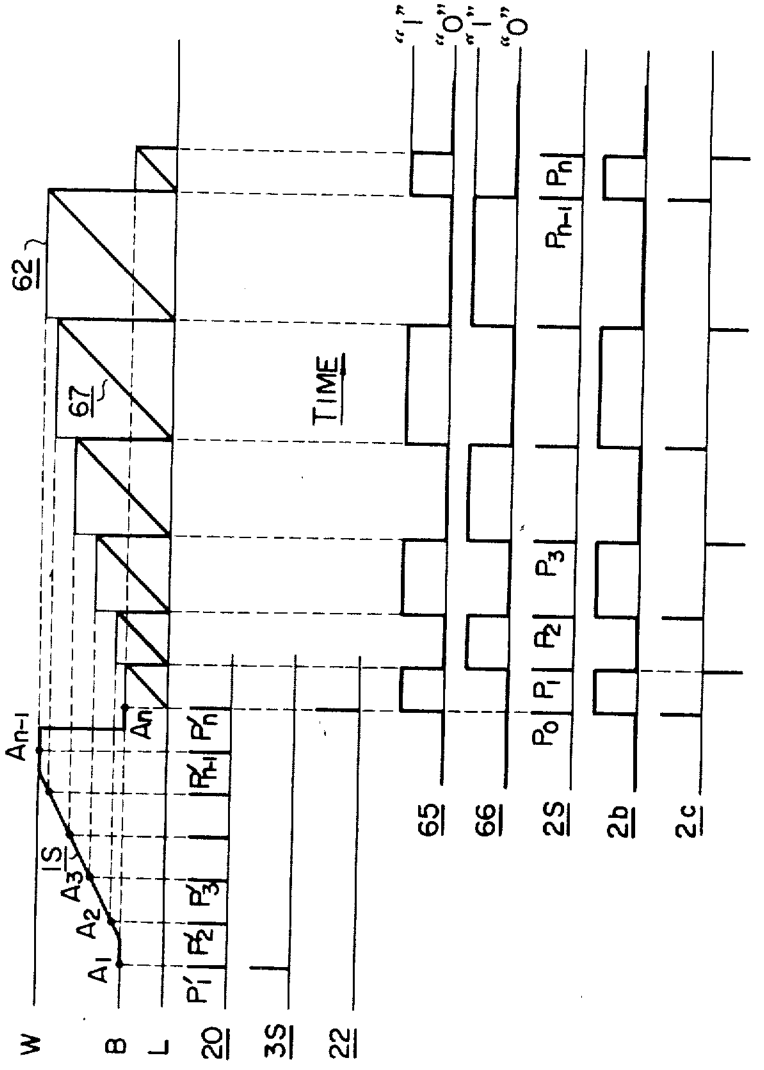
FIG. 6 is a diagram of signal waveforms for explaining the operation of the apparatus of FIG. 5.

FIG. 6 shows input and output waveforms at various parts of the system of FIG. 5. Here, the term "modulated pulse train signal" used in this specification includes, in addition to the signal of a train of pulses of the same polarity 2S, the signal 2*b* of pulses having widths the leading and trailing edges of which are alternate pulses of the pulse train signal 2S, and the signal 2*c* of a train of pulses of alternate polarities which is produced by differentiating and shaping the signal 2*b*.

Figure 7:
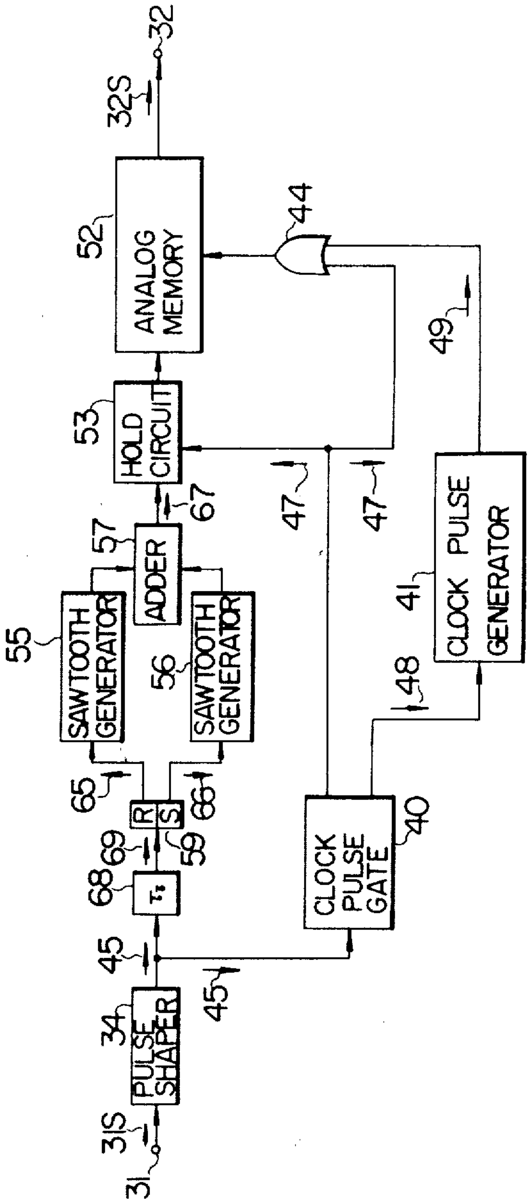
FIG. 7 is a block diagram of another apparatus for converting a pulse train signal of a narrow band into the original picture signal.

FIG. 7 shows an embodiment of the system for converting the pulse train signal into the original picture signal in an analog manner. Parts having the same function as those in FIGS. 4*a* and 5 are designated by the same reference numerals. Reference numeral 68 designates a pulse delay circuit for delaying the pulse signal by the time $\tau_3$. The time $\tau_3$ is for compensating for the level corresponding to the reference level L of the output signal 32. Reference numeral 53 designates a sampled amplitude holding circuit for sampling the amplitude of the continuous saw tooth wave signal 67 by the write-in clock pulse signal 47 and holding the sampled amplitudes for a constant time.

Figure 8:
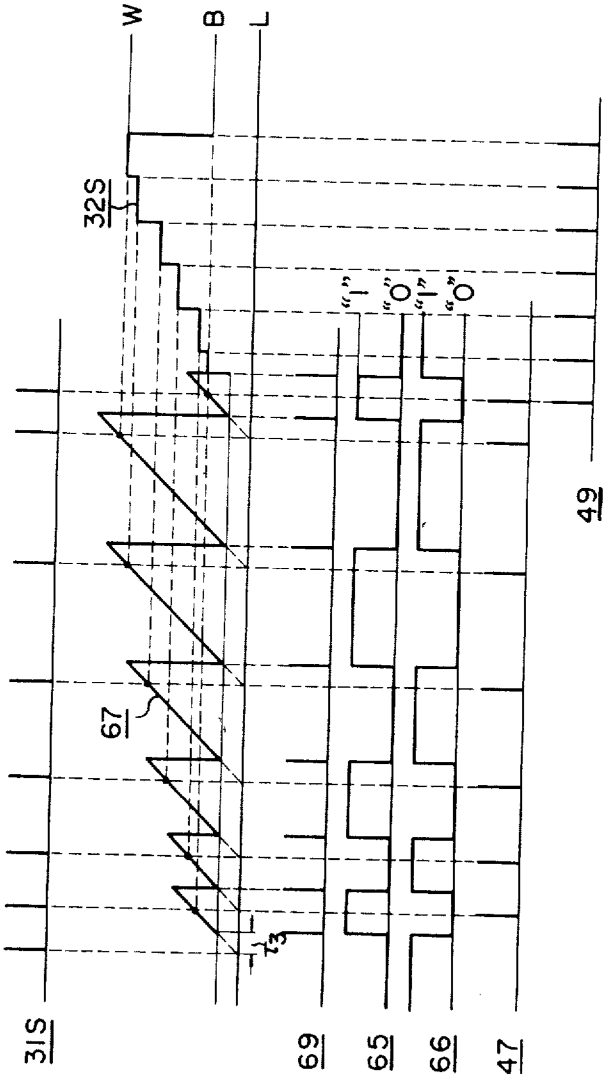
FIG. 8 is a diagram of signal waveforms for explaining the operation of the apparatus of FIG. 7.

Next, the operation of the system of FIG. 7 will be described with reference to FIG. 8. The pulse train signal 45 produced by the pulse shaping circuit 34 is, after delayed by the time $\tau_3$ by the delay circuit 68, applied to the input T of the flip-flop circuit 59 so that the state 1 of its R and S outputs are alternately applied to the intermittent saw tooth wave generators 55 and 56, respectively, to produce a continuous saw tooth wave signal 67 through the voltage adder 57. On the other hand, the pulse signal 45 from which its first pulse is eliminated by the write-in clock pulse gate circuit 40 is applied to the sampled amplitude holding circuit 53 and the analog memory 52 as a write-in clock pulse signal 47 by which the amplitude of the continuous saw tooth wave signal 67 is sampled and successively written in the analog memory 52. By reading the written in analog signal from the analog memory 52 after the end of the writing in, the original picture signal can be reproduced.

In the embodiment of FIGS. 5 and 7 a pair of saw tooth wave generators are employed. This is because the fly-back time of one generator can be selected to be any time within the sweep time of the other generator. However, if the fly-back time is selected appropriately, the signal conversion can sufficiently be performed with only one generator.

Figure 9:
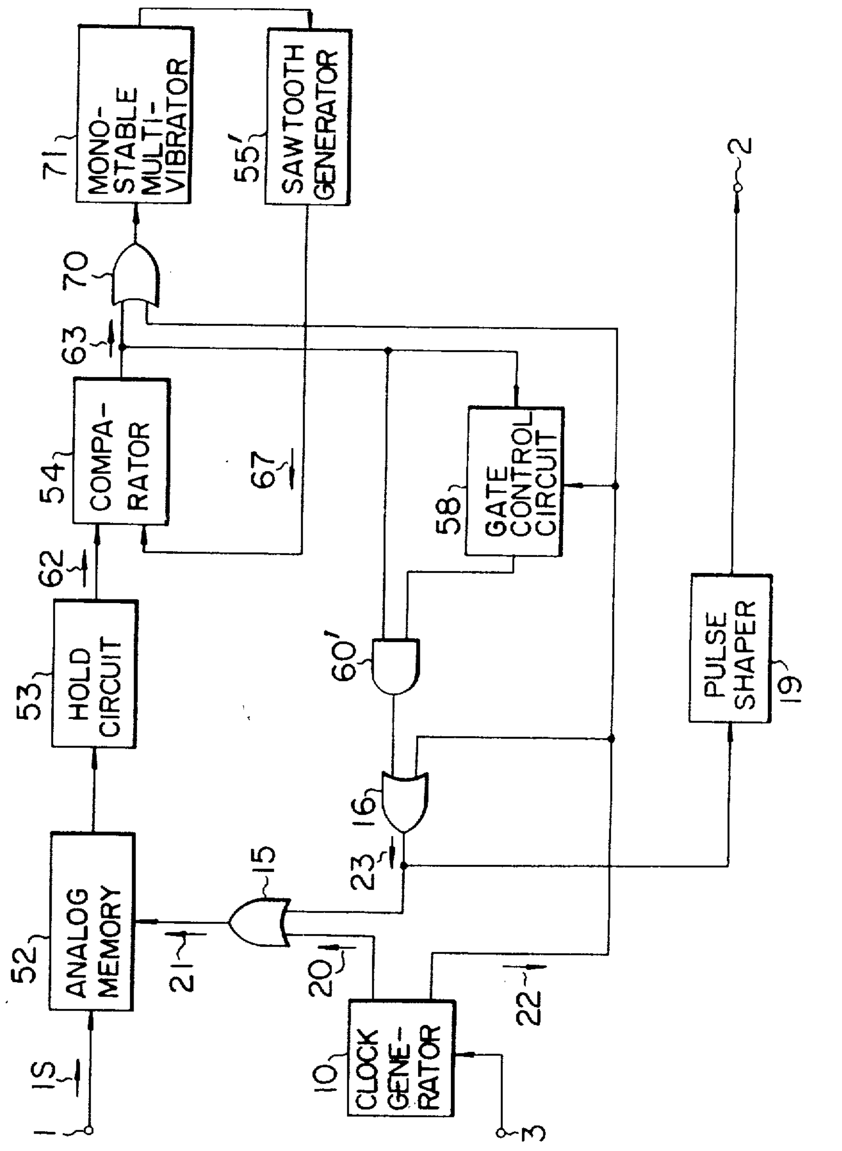
FIG. 9 is a block diagram of a further apparatus for converting a picture signal into a pulse train signal of a narrow band.
Figure 10:
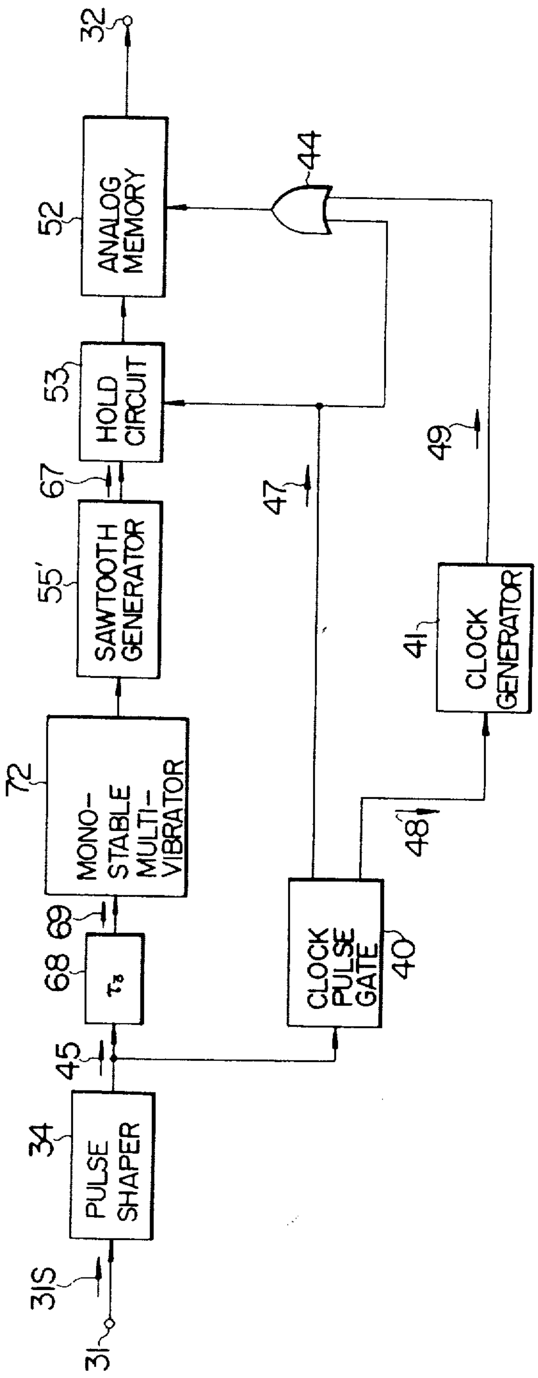
FIG. 10 is a block diagram of a further apparatus for converting a pulse train signal of a narrow band into the original picture signal.

An embodiment which employs one saw tooth wave generator is shown in FIGS. 9 and 10. FIG. 9 illustrates a system for converting the picture signal into the pulse train signal of the narrow band, while FIG. 10 illustrates a system for converting the pulse train signal into the picture signal of a wide band. These circuits are generally similar to those of FIGS. 5 and 7. Consequently, the operation thereof will be described only briefly. The OR gate 70 and the monostable multivibrator 71 in FIG. 9 are different from the circuit of FIG. 5. The function of the saw tooth wave generator 55' is such that the output thereof is allowed to fly back to the start point by the leading edge of the input pulse and the generation of the saw tooth wave is started by the trailing edge of the input pulse.

The picture signal supplied to the input terminal 1 is sampled by the clock pulses 20 sufficient for recording one picture produced by the clock pulse generator 10 with the periods of the clock pulses and stored in the analog memory 52. When the clock pulses just for recording the signal for one picture are produced by the clock pulse generator 10, the production of the clock pulses 20 is stopped, but instead one pulse 22 designating the filling up of the analog memory 52 is produced. The pulse 22 is applied to the read-out limiting gate 58 to set its output to 1 by which the AND gate 60' is opened. The pulse 22 is also applied to the analog memory 52 through the OR gates 16 and 15 to read out one sample value which is to be held in the hold circuit 53. The pulse 22 is further applied to the monostable multivibrator 71 through the OR gate 70 to enable the multivibrator 71 to produce a pulse having a predetermined pulse width which is applied to the saw tooth wave generator 55'. Then, the output of the saw tooth wave generator 55' is caused to fly back to the start point of the saw tooth wave by the leading edge of the last named pulse and begins to trace the saw tooth wave upon the arrival of the trailing edge of the last named pulse. This output signal of the saw tooth wave generator 55' is applied to the comparator 54. When the latter output signal increases to the value equal to the amplitude of the signal held in the hold circuit 53, the comparator 54 produces the coincidence pulse 63 which is applied to the monostable multivibrator 71 through the OR gate 70 to cause it to produce a pulse having a predetermined width. This pulse is the one which has been described to actuate the saw tooth wave generator 55'.

The coincidence pulse 63 is also applied to the analog memory 52 through the AND gate 60' and the OR gates 16 and 15 to read out the next one sample value from the analog memory 52. The latter sample value is held in the hold circuit 53.

The coincidence pulse 63 is further applied to the read-out limiting gate 58. The read-out limiting gate 58 counts the coincidence pulses 63 and when the number of the coincidence pulses 63 reaches one which reads out all the sampled signals stored in the analog memory 52, the output of the read-out limiting gate 58 is set to 0 to close the AND gate 60'.

By suitably shaping the output signal of the OR gate 16 by the pulse shaping circuit 19 a pulse train signal with pulse intervals proportional to the sample values of the signal stored in the analog memory 52 can be provided. The pulse interval corresponding to a sample value can be adjusted by selecting the width of the pulse produced by the monostable multivibrator 71 and the slope of the ramp signal produced by the saw tooth wave generator 55'.

Finally, a description will be made of the system for reconverting the pulse train signal into the original picture signal shown in FIG. 10. The system of FIG. 10 is different from the system of FIG. 7 only in that the monostable multivibrator 72 and the saw tooth wave generator 55' are employed in the system of FIG. 10 in place of the flip-flop circuit 59, the saw tooth wave generators 55 and 56, and the adder 57 in the system of FIG. 7. Consequently, in place of the fact that in the system of FIG. 7 the intermittent saw tooth waves alternately produced by the saw tooth wave generators 55 and 56 are made into a continuous saw tooth wave by the adder 57 the continuous saw tooth wave is produced by one saw tooth wave generator 55' in the system of FIG. 10. The remaining operations are almost similar to each other in the systems of FIGS. 7 and 10, and hence no further description will be made.

In the above description digital and analog conversions between the picture signal and the modulated pulse train signal were explained. However, these digital and analog conversion schemes can be combined as desired. For example, when a transmission channel is employed as the transmission medium, both signal transmission and reception may be made by digital or analog operation, or signal transmission may be made in a digital manner and signal reception may be made in an analog manner, or conversly signal transmission may be made in an analog manner and signal reception may be made in a digital manner. When a magnetic tape is employed as the transmission medium, the transmission side and the reception side may be constructed independently of each other.

We claim:

1. A signal conversion system for converting a picture signal into a pulse train signal of a low frequency band, comprising:

analog to digital converting means for converting a picture signal into a coded signal by sampling the picture signal;

a digital memory having a capacity capable of storing at least one frame of a picture signal converted into the digital signal, in and from which the digital signal can be written and read by the application of a pulse signal thereto;

means for producing clock pulses having periods equal to the sampling periods by the analog to digital converting means;

a hold circuit for temporarily storing one coded sample value read from the digital memory;

means for producing a reference pulse signal having a predetermined period;

counting means for counting the number of pulses of the reference pulse signal produced by the pulse signal producing means;

a coincidence circuit for producing a coincidence pulse when the coded signal stored in the hold circuit and the coded signal corresponding to the number counted by the counting means are in agreement with each other;

means for writing the picture signal of one frame coded by the analog to digital converting means, successively, sample value by sample value, in the digital memory by the application thereto of the clock pulses from the clock pulse producing means;

means for producing, upon completion of writing the picture signal of one frame in the digital memory, a pulse to output it as one of the pulses of an output pulse train signal, and to apply it to the digital memory to read one sample value of the stored coded signal therefrom, and for storing the read out one sample value in the hold circuit;

means for supplying the coincidence circuit with the coded signal stored in the hold circuit and the coded signal representative of the number of pulses of the reference pulse signal counted by the counting means to compare them; and means for providing the coincidence pulse produced by the coincidence circuit as the pulse train signal, for resetting the counting means and the hold circuit by the coincidence pulse, and for applying the coincidence pulse to the digital memory to read therefrom the next one sample value of the stored coded signal which is stored in the hold circuit.

2. A signal conversion system for converting a picture signal into a pulse train signal of a low frequency band, comprising:

memory means having a memory capacity sufficient for storing a picture signal of one frame, capable of having written therein and read out therefrom, by being supplied with a pulse signal and capable of storing in analog form, the values of the picture signal sampled with the period of the pulse signal;

means for producing clock pulses for sampling the picture signal and writing in the memory means;

a hold circuit for temporarily storing one sample value of the signal read from the memory means;

a comparator circuit having two terminals for comparing the amplitudes of two input signals applied thereto and for producing a coincidence pulse when the amplitudes are in agreement with each other;

a saw tooth wave signal producing means for producing a ramp signal with a predetermined slope;

means for applying the clock pulses from the clock pulse producing means to the memory means to write the picture signal therein while sampling the picture signal with the periods of the clock pulses and for reading the stored first one sample value, after the completion of the writing-in of the picture signal of one frame, to store it in the hold circuit;

means for applying the signal held in the hold circuit to one input of the comparator circuit, for applying the output signal of the saw tooth wave signal producing means to the other input of the comparator circuit, and for causing the saw tooth wave signal producing means to start the production of the ramp signal when the signal read from the storing means is written in the hold circuit; and means for providing the coincidence pulse produced by the comparator circuit as the pulse of the pulse train signal of the picture signal, for causing the output signal of the saw tooth wave signal producing means to fly back to the starting value of the ramp signal by triggering with the coincidence pulse, and for applying the coincidence pulse to the memory means to read therefrom the next one sample value which is written in the hold circuit.

3. A signal conversion system for converting a picture signal into a pulse train signal of a low frequency band, comprising:

memory means having the memory capacity sufficient for storing a picture signal of one frame, capable of having written therein and read out therefrom, by being supplied with a pulse signal and capable of storing in analog form, the values of the picture signal sampled with the period of the pulse signal;

means for producing clock pulses for sampling the picture signal and writing in the memory means;

a hold circuit for temporarily storing one sample value of the signal read from the memory means;

a comparator circuit having two terminals for comparing the amplitudes of two input signals applied to the terminals and for producing a coincidence pulse when the amplitudes are in agreement with each other;

a pair of saw tooth wave signal producing means for producing alternately ramp signals with a predetermined slope;

means for applying the clock pulses from the clock pulse producing means to the memory means to write the picture signal therein while sampling the picture signal with the periods of the clock pulses and for reading the stored first one sample value, after the completion of the writing-in of the picture signal of one frame, to store it in the hold circuit;

means for applying the signal held in the hold circuit to one input of the comparator circuit, for applying the output signals of the pair of saw tooth wave signal producing means to the other input of the comparator circuit, and for causing one of the pair of saw tooth wave signal producing means to start the production of the ramp signal when the signal read from the memory means is written in the hold circuit;

means for delivering the coincidence pulse produced by the comparator circuit as the pulse of the pulse train signal of the picture signal;

means for applying the coincidence pulse to the memory means to read therefrom the next one sample value which is written in the hold circuit; and means for resetting the output signal of the saw tooth wave signal producing means being producing the output signal to the starting value of the ramp signal and for causing the other saw tooth wave signal producing means to start the production of the ramp signal.

4. A signal conversion system for converting a pulse train signal pulse interval modulated by a picture signal into an analog picture signal, comprising:

reference pulse producing means for producing a reference pulse signal of a predetermined constant period;

counting means for counting the number of pulses of the reference pulse signal;

a digital memory capable of having written therein and read out therefrom supplied pulse signals at a rate corresponding to the rate of the pulse signals and capable of storing signals of one frame of sampled picture signal;

means for producing clock pulses of periods equal to the periods of the sampling;

a digital-to-analog converter means for converting a digital signal into an analog signal;

means for causing the counting means to count the number of pulses of the reference pulse signal supplied from the reference pulse producing means each time a pulse of a pulse train signal is applied, to convert the pulse intervals of the pulse train signal into the pulse number of the reference pulse signal and for writing the pulse intervals in the digital memory as a coded signal representative of the pulse number, each time the pulse of the pulse train signal is applied; and means for reading the stored coded signal from the digital memory by applying clock pulses from the clock pulse producing means to the digital memory when the writing of signals for the memory capacity in the digital memory is completed, to supply the read out coded signal to the digital-to-analog converter means.

5. A signal conversion system for converting a pulse train signal pulse interval modulated by a picture signal into an analog picture signal, comprising:

saw tooth wave signal producing means for producing ramp signals of a predetermined slope;

a hold circuit for holding the amplitudes of an input pulse signal for a predetermined time;

memory means capable of having written therein and read out therefrom an input analog signal depending on the period of a supplied pulse and having a memory capacity capable of storing a sampled picture signal of one frame;

means for producing clock pulses of a constant period equal to the sampling period;

means for applying the pulse train signal to the saw tooth wave signal producing means to start the production of a ramp signal by the first pulse of the pulse train signal, and causing, by the next pulse, the ramp signal to fly back to the start point and again start the production of a ramp signal, thus producing a saw tooth wave of ramp signals equal to the pulse intervals, respectively, of the pulse train signal, and for causing the hold circuit to hold the maximum amplitude of a ramp signal each time a pulse of the pulse train signal is applied; and means for writing the amplitude held by the hold circuit in the memory means each time a pulse train signal is applied until the memory capacity is filled, and for reading the stored signal by applying clock pulses from the clock pulse producing means.

6. A signal conversion system for converting a picture signal of a low frequency band into a train of pulse signals comprising:

means for sampling a picture signal and encoding the values of the amplitudes of sampled signal elements;

digital memory means for memorizing the coded signals produced by said encoding means;

means for producing a reference pulse train of a predetermined constant frequency;

counter means for counting the pulses of said reference pulse train;

means for reading out from said memory means said coded signals, successively, each corresponding to one of said sampled signal elements and comparing each of said coded signals thus read out with the number of pulses of said reference pulse train counted by said counter means to thereby produce a reset pulse signal each time said number of pulses reaches the value represented by said each coded signal; and means for resetting said counter means each time said reset pulse is produced.

7. A signal conversion system for converting a picture signal into a train of pulse signals of a low frequency band comprising:

means for sampling signal elements from a picture signal at a predetermined frequency;

analog memory means adapted to have written thereinto, successively, signals representative of the amplitudes of said sampled signal elements in accordance with a first clock signal having a frequency substantially the same as the frequency of said sampling and to have read out, successively therefrom, said signals in accordance with a second clock pulse;

means for producing a ramp signal whose amplitude changes progressively with a predetermined slope;

means for reading out said signals, successively, written in said analog memory means and comparing the value of each of said signals thus read out with the amplitude of said ramp signal to thereby produce a reset pulse each time said amplitude of said ramp signal reaches a value equal to the value of said each read out signal; and means for resetting the amplitude of said ramp signal to its original value each time said reset pulse is produced, and causing said reading out means to read out the next one of said signals written in said analog memory means.

8. A signal conversion system for converting a train of pulse signals, which are spaced one another by intervals of time, respectively, proportional to the values of sampled elements of a picture signal, into an analog picture signal of a video signal frequency comprising:

memory means adapted to have written therein and read out therefrom signals at a rate corresponding to the rate of clock pulses applied thereto;

means for producing a train of reference pulses at a predetermined constant frequency;

counter means for counting the number of said reference pulses, said counting starting upon receiving one of the pulse signals to be converted into an analog picture signal and ending upon receiving the next one thereof;

means for writing into said memory means code signals each representative of the instant counter number of said counter means each time out of said pulse signals to be converted into the analog picture signal is applied thereto by applying said pulse signals, as clock pulses, to said memory means;

means for producing clock pulses having a predetermined constant frequency which is the same as that used in sampling of the picture signal;

means for reading out said code signals written into said memory means, successively, in accordance with said clock pulses having said constant frequency, and means for converting code signals thus read out into analog signals, respectively.

9. A signal conversion system for converting a train of pulse signals, which are spaced one another by intervals of time, respectively, proportional to the values of sampled elements of a picture signal, into an analog picture signal of a video signal frequency comprising:

analog memory means adapted to have written therein and read out therefrom signals at a rate corresponding to the rate of clock signals applied thereto;

means for producing repeatedly a saw-tooth wave signal which begins to change progressively from a predetermined reference value with a predetermined value upon receiving each of the pulse signals to be converted into the analog picture signal and then returned to the reference value upon receiving the next one of said pulse signals;

means for writing into said analog memory means signals, respectively, corresponding to the peak values of said saw-tooth wave signals thus produced repeatedly, by using said pulse signals as clock pulses;

means for producing clock pulses having a predetermined constant frequency which is the same as that used in sampling of the picture signal; and means for successively reading out the signals written into said analog memory by applying said clock pulses having said constant frequency to said memory.

10. A signal conversion system for converting a picture signal into a pulse train signal of a low frequency band, comprising:

storing means adapted to store input signals successively in accordance with a first clock signal of a predetermined frequency and to read out said stored signals successively in accordance with a second clock signal;

means for sampling a picture signal and applying to said storing means signals respectively representative of the amplitudes of the sampled elements of said picture signal in accordance with said first clock signal;

means for producing clock pulses successively, which are spaced one another by intervals of time, respectively, proportional to the amplitudes of the sampled elements represented by the signals read out from said storing means and ready for read out;

means for reading out the signals stored in said storing means, successively, in accordance with said clock pulses as the second clock signal; and means for producing a pulse each time one of the signals is read out from said storing means, thereby producing a train of pulses which are spaced from one another by intervals of time, respectively, proportional to the amplitudes of the sampled elements of said picture signal.

11. A signal conversion system for converting a signal of a train of pulses, of a low frequency band, spaced one another by intervals of time, respectively, proportional to values sampled with a predetermined constant frequency, successively, from a picture signal, into an analog picture signal of a video signal frequency comprising:

memory means adapted to have written therein and read out therefrom signals at a rate corresponding to the rate of clock pulses applied thereto;

means for producing signals having amplitudes respectively proportional to the successive intervals of time with which trains of pulse signals are applied thereto;

means for writing into said memory means the signals produced by said producing means by using said train of pulse signals applied to said producing means as the clock pulses to be applied to said memory means;

means for generating clock pulses with a frequency substantially equal to a constant frequency used in sampling from the picture signal; and means for reading out the signals written into said memory means by applying said clock pulses produced by said clock pulse generating means to said memory means.

12. A signal conversion system for converting an analog signal having a low frequency band into a train of pulses representative of said analog signal comprising:

first means for sampling the amplitude of an analog signal and encoding each respective sampled amplitude value of the analog signal;

second means, coupled to said first means, for storing the respective encoded sampled amplitude values of the analog signals;

third means, coupled to said second means, for generating respective sequences of pulses, the number of pulses in each sequence being proportional to the respective encoded sampled amplitude value of the analog signal; and fourth means, coupled to said third means, for generating an output signal made up of a train of pulses the respective intervals between which are proportional to the respective numbers of pulses in the sequences of pulses generated by said third means;

whereby the intervals between the pulses in said output signal are representative of the respective sampled amplitude values of said analog signal.

13. A signal conversion system according to claim 12, wherein said third means includes controlled pulse generating means which generates series of pulses at a prescribed frequency;

a counter, coupled to said pulse generating means, for counting the pulses generated thereby; and means, coupled to said second means and said counter, for comparing the contents of said counter with a respective encoded sampled amplitude value, and for controlling the number of pulses in each series in accordance with the coincidence of the encoded value and the contents of said counter.

14. A signal conversion system according to claim 13, wherein said fourth means includes means for generating a respective pulse making up said train of pulses upon the generation of the last pulse in each respective series of pulses generated by said controlled pulse generating means.

15. A signal conversion system according to claim 14, wherein the sequences of pulses generated by said third means are separated from each other by a constant time interval.

16. A signal conversion system for converting a train of pulses, the spacing between which is variable, into an analog signal, the amplitude of which is produced in accordance with said spacing, comprising:

first means, coupled to receive said train of pulses for generating respective sequences of pulses, the number of pulses in each sequence respectively being proportional to the spacing between the pulses in said train;

second means, coupled to said first means, for counting the number of pulses in each sequence; and third means, coupled to said second means, for decoding the number of pulses counted by said second means, and converting the decoded number into an analog signal, the amplitude value of which at sequential instants of time is proportional to the respective decoded numbers.

17. A signal conversion system according to claim 16, wherein said first means includes means for generating a respective sequence of pulses during only a portion of the interval of time defined by the spacing between the pulses in said train.

18. A signal conversion system according to claim 17, wherein said portion is proportional to the spacing between the pulses in said train.

19. A signal conversion system for converting an analog signal into a train of pulses representative of said analog signal comprising:

first means for sampling the amplitude of an analog signal and storing each respective sampled amplitude value;

second means for generating a first signal the amplitude of which changes in proprotion to the lapse of time from the beginning of the signal; and third means, coupled to said first means and said second means, for comparing the respective sampled amplitude values of said analog signal with the amplitude of said first signal and for generating a pulse upon the amplitude of said first signal corresponding to a respective sampled amplitude value of said analog signal and for resetting said second means to initiate the regeneration of said first signal, whereby a train of pulses is generated, the time intervals between which is representative of the respective sampled amplitude values of said analog signal.

20. A signal conversion system according to claim 19, wherein said second means comprises first and second ramp generators alternately controlled by said third means in response to every other pulse generated thereby.

21. A signal conversion system according to claim 19 wherein said second means comprises a single ramp generator the operation of which is reset in response to each pulse generated by said third means.

22. A signal conversion system for converting a train of pulses, the spacing between which is variable, into an analog signal, the amplitude of which is produced in accordance with said spacing, comprising:

first means, coupled to receive said train of pulses, for generating a respective first signal, the amplitude of which changes in proportion to the lapse of time from the beginning of the signal in response to each successive pulse in said train;

second means, coupled to said first means, for sampling the amplitude of said first signal generated in response to each successive pulse in said train;

third means, coupled to said second means, for storing each respective first signal sampled amplitude for a prescribed period of time; and fourth means, coupled to said third means, for reading out the stored first signal sampled amplitudes in sequence, thereby providing said analog signal.

23. A signal conversion system according to claim 22, wherein said first means includes first and second ramp generators alternately controlled in response to every other pulse in said train.

24. A signal conversion system according to claim 22, wherein said first means comprises a single ramp generator the operation of which is reset in response to each pulse in said train.

* * * * *